(12) United States Patent
Brown, Jr.

(10) Patent No.: US 6,460,795 B1
(45) Date of Patent: Oct. 8, 2002

(54) DUAL-FEED RIBBON CABLE REEL FOR TELESCOPING ANTENNA MASTS

(76) Inventor: James M. Brown, Jr., 1924 Saxon Blvd, Deltona, FL (US) 32725

( * ) Notice: Subject to any disclaimer, the term of this patent is extended or adjusted under 35 U.S.C. 154(b) by 0 days.

(21) Appl. No.: 09/876,309

(22) Filed: Jun. 7, 2001

(51) Int. Cl.$^7$ ............................................... B65H 75/48
(52) U.S. Cl. ................. 242/378.2; 242/377; 242/404.2; 191/12.2 R
(58) Field of Search .......................... 242/378.1, 378.2, 242/378.3, 378, 377, 404.2; 191/12.2 R, 12.2 A; 343/889

(56) References Cited

U.S. PATENT DOCUMENTS

| | | | | |
|---|---|---|---|---|
| 452,799 A | | 5/1891 | Matteson | |
| 486,604 A | * | 11/1892 | Porter | 242/378.3 |
| 644,008 A | * | 2/1900 | Fisher | 242/378 |
| 672,543 A | * | 4/1901 | Wirt | 242/377 |
| 994,025 A | * | 5/1911 | Montgomery | 242/377 |
| 2,514,628 A | | 7/1950 | Cortes | |
| 2,518,072 A | * | 8/1950 | Rushworth | 242/378.2 |
| 2,742,242 A | | 4/1956 | Godwin | |
| 2,952,420 A | | 9/1960 | Von Hoorn | |
| 3,474,985 A | | 10/1969 | Brudi | |
| 3,601,331 A | | 8/1971 | Frey | |
| 3,809,331 A | | 5/1974 | Gaul | |
| 4,008,791 A | * | 2/1977 | Shafil-Kahany et al. | 242/378.2 |
| 4,053,118 A | * | 10/1977 | Aikins | 242/378.2 |
| 4,417,703 A | | 11/1983 | Weinhold | |
| 4,466,581 A | | 8/1984 | Hill | |
| 4,646,987 A | * | 3/1987 | Peterson | 242/378.3 |
| 4,653,833 A | | 3/1987 | Czubernat | |
| 4,942,964 A | | 7/1990 | Hsu | |
| 5,129,828 A | | 7/1992 | Bass | |
| 5,186,406 A | * | 2/1993 | Romanelli | 191/12.2 R |
| 5,236,143 A | * | 8/1993 | Dragon | 242/378.1 |
| 5,468,159 A | | 11/1995 | Brodsky | |
| 5,855,262 A | | 1/1999 | Jackson | |
| 6,328,243 B1 | * | 12/2001 | Yamamoto | 242/378.1 |

* cited by examiner

Primary Examiner—John M. Jillions
(74) Attorney, Agent, or Firm—John V. Stewart (57) ABSTRACT

A reel mounted at the midpoint of a telescoping mast for antennas. The reel winds a multi-celled ribbon cable in two directions at once. The cable passes through the hub of the reel to feed in both winding directions. The reel is mounted on the mast with a clamp that fits a range of existing mast sizes, and distributes the stress of the reel on the mast sufficiently to avoid distortion of the mast. The reel preferably has a cable tensioner wheel on both cable feeds to prevent the cable from slipping off the reel. A selection of cables can be pulled through the multi-celled ribbon sheath by an installer to support a given installation. The outer plate of the reel can be easily removed to remove the cable sheath from the hub for changing the selection of cables in the sheath.

6 Claims, 8 Drawing Sheets

DUAL-FEED RIBBON CABLE REEL FOR TELESCOPING ANTENNA MASTS

BACKGROUND OF THE INVENTION

1. Field of the Invention

This invention relates to telescoping masts for antennas on mobile electronics platforms, such as television and communications support trucks.

2. Description of Prior Art

Vertical retractable masts are often provided on mobile communications support vehicles for television news reporting support. The mast is composed of a series of nested tubes. The mast is extended by pumping compressed air into the largest tube at the bottom. Each tube acts as a piston within the next larger tube. The mast remains extended by retaining an air pressure differential with respect to ambient air pressure. Supplemental periodic air pumping may be needed to compensate for leakage.

The purpose of the mast is to raise one or more antennas to a workable height above the ground and above the vehicle. Electrical cables for the antennas must extend and retract with the mast. The cables required for a given antenna installation are pulled through a cable sheath that is adapted for this use. The type of cable sheath in current use is a semi-flexible tube formed into a helix surrounding the mast. The helix extends and contracts with the mast.

Since the cables circle the mast repeatedly in the helix, the total length of the cables is more than twice the height of the mast. Longer electrical cables need larger conductors and better shielding to avoid signal loss. This combination of excess cable length and size multiplies the weight of the cables supported by the mast. In turn, this multiplies the strength and air pressure requirements for the mast, making it heavier, more expensive, and requiring a heavier vehicle to support a given payload. Conversely the heavy cables reduce the payload that can be supported by the mast and the payload that can be carried by the vehicle.

In addition to this problem, it is difficult to pull electrical cables through the helical sheath. The sheath must be stretched and held straight while the cables are pulled through it. This requires a very long workbench and mechanisms to stretch the cable to a nearly straight condition. The sheath must have substantial form-holding elasticity to return to a helical shape. Thus, the sheath itself is heavy and expensive.

Furthermore, the helix can catch the wind and swing from side to side, causing additional stress on the mast that must be accommodated in the mast strength.

SUMMARY OF THE INVENTION

The objectives of the present invention are provision of a cable reel for telescoping antenna masts that minimizes cable length and weight, minimizes cable movement in wind, simplifies combining cables in an appropriate sheath, and reduces the strength requirement of the sheath. A further objective is retrofit capability for using the reel on existing telescoping masts.

These objectives are fully achieved by means of a reel mounted at the mid-point of a telescoping mast for antennas. The reel winds a multi-celled ribbon cable that passed through the hub to feed and wind in two directions at once. The reel is mounted on the mast with a clamp that fits a range of mast sizes, and distributes the weight of the reel on the mast sufficiently to avoid distortion of the mast. The reel preferably has a cable tensioner wheel on both cable feeds to prevent the cable from slipping off the reel. A selection of cables can be pulled through the multi-celled ribbon sheath by the installer to support a given installation. The outer plate of the reel can be easily removed to remove the cable sheath from the hub for changing the selection of cables in the sheath.

REFERENCE NUMBERS

1. Dual-feed cable reel
2. Reel axle
3. Axle bushing
4. Hub segment
5. Cable protection bar
6. Inner main plate of reel
7. Outer main plate of reel
8. Backing plate
9. End plate
10. Reel axle locking collar
11. Spring motor
12. Ribbon cable multi-celled sheath
13. Various electrical and optical cables as needed
14. Mast locking collar strap adjustment slot
15. Mast locking collar strap
16. Mast tube clamping strap
17. Mast tube clamping strap bolt
18. Clamp frame
19. Spacer
20. Telescoping mast
21. Outer mast section at middle joint of mast
22. Inner mast section at middle joint of mast
23. Mast section locking collar
25. Mast section external bumper
26. Mast section internal bumper
27. Mast section wear ring
28. Mast section cup seal
29. Mast section bolt with pressure port
30. Communications support trailer
31. Antenna equipment
32. Cable tensioner arm
33. Cable tensioner wheel
34. Cable tensioner spring
35. Mast locking collar strap attachment/adjustment bracket

DETAILED DESCRIPTION

Figure 1:
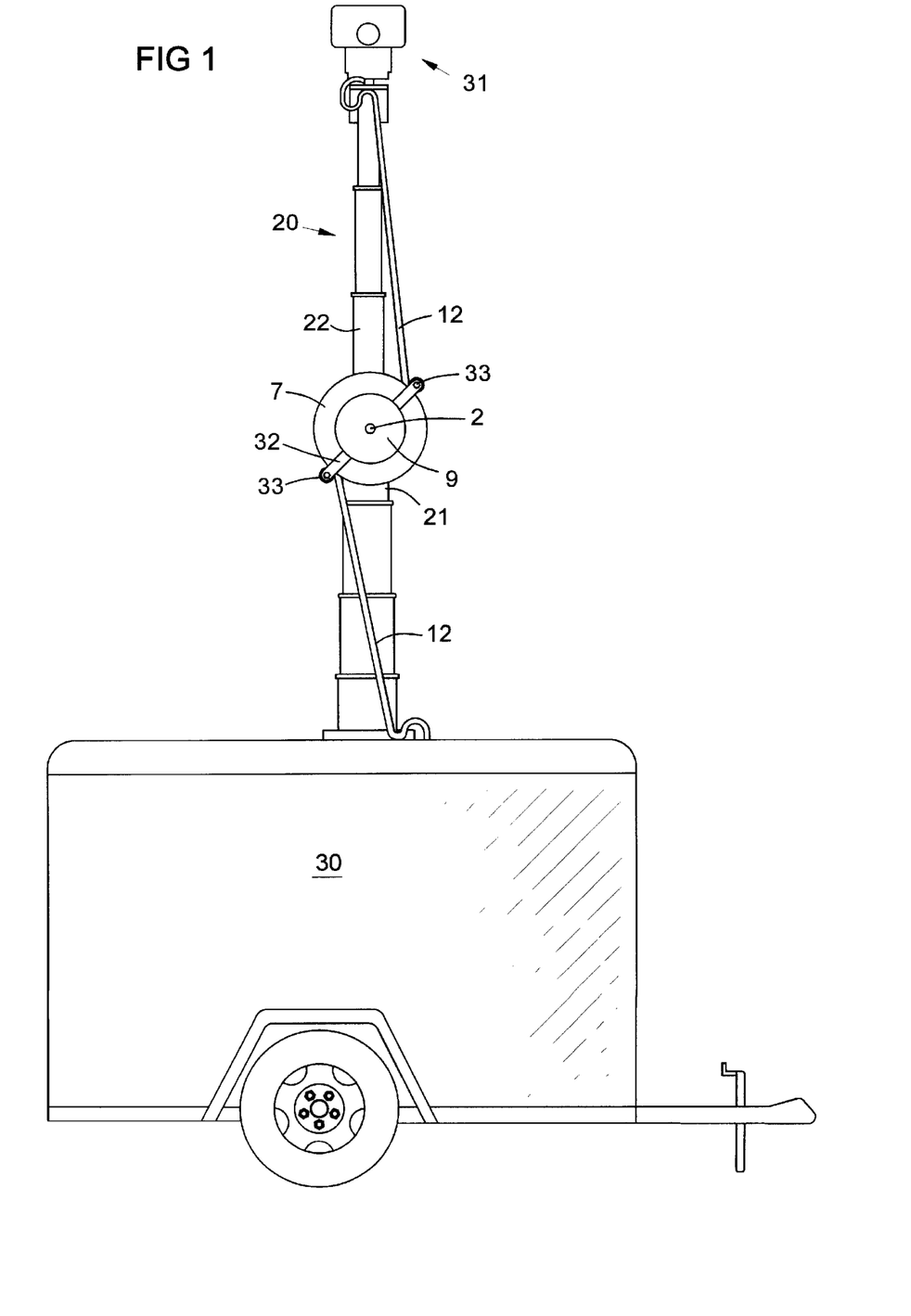
FIG. 1 is a side view of a communications support trailer with a telescoping mast.
Figure 2:
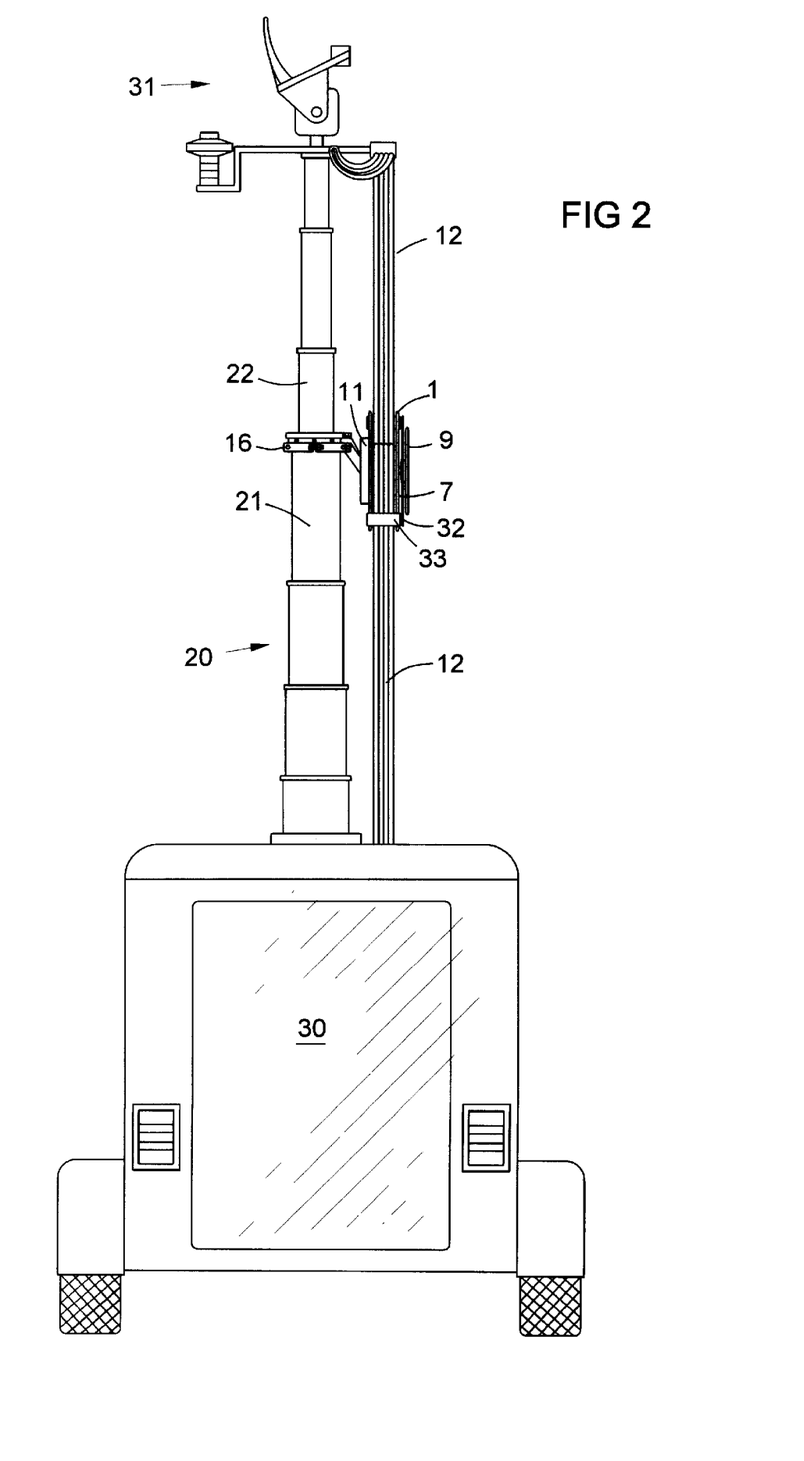
FIG 2 is a back view of the trailer of FIG. 1.

FIG. 1 shows a telescoping mast 20 for antennas on a communications support trailer 30. The mast collapses into itself, and retracts partly into the top of the trailer for travel. Such masts are often provided on self-contained motor vehicles for mobile television news reporting support. The mast is composed of a series of nested tubes as described under "Description of Prior Art" above.

Cables for antennas on top of the mast must extend and retract with the mast. For this purpose, a dual-feed cable reel 1 is attached to the midpoint of the mast. It feeds or winds a cable to/from two directions simultaneously. The cable passes through the hub as shown in FIG. 3.

Figure 4:
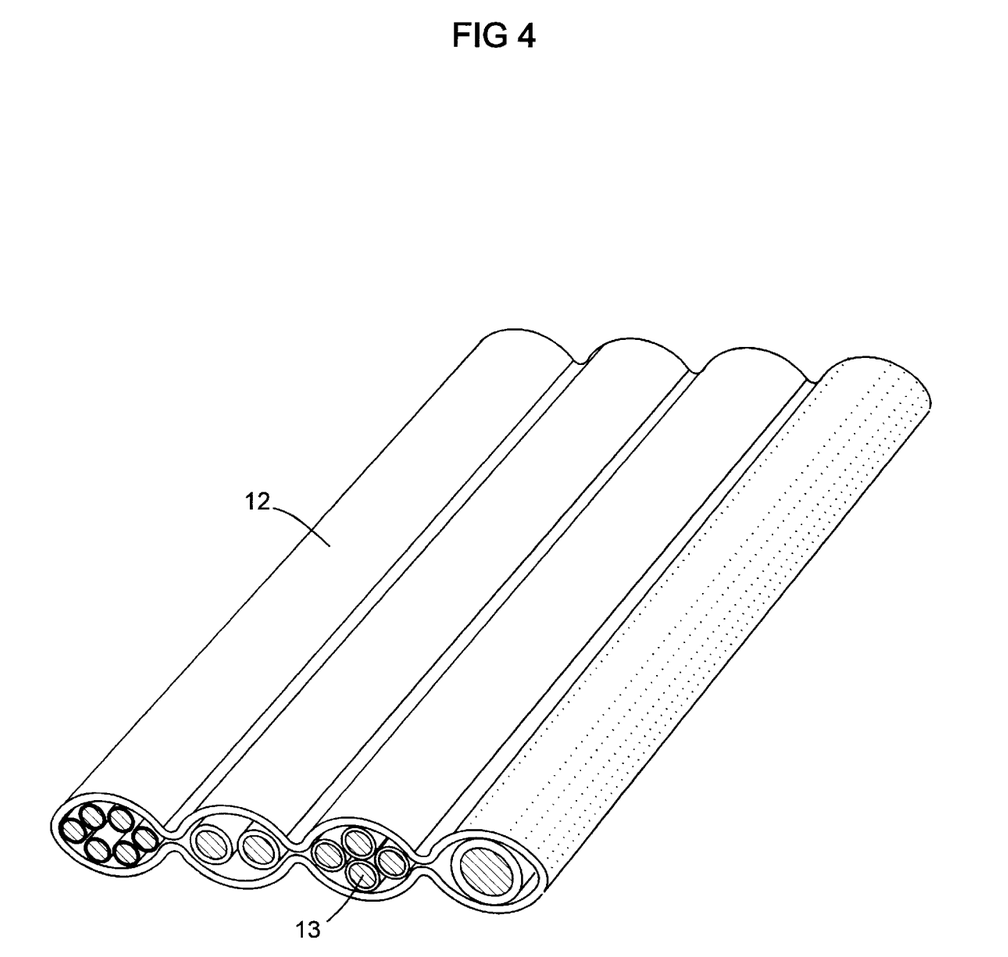
FIG. 4 is a perspective view of a ribbon cable for antenna masts.

A preferred cable form is shown in FIG. 4. A multi-celled ribbon sheath 12 is provided. An appropriate selection of cables 13 is pulled through the sheath by the installer. This is a much easier and safer operation than pulling cables through a conventional helical sheath. The ribbon sheath 12 can have a relaxed or straight default shape, so the person pulling cables through it is not fighting spring tension of a helical sheath. This is allows a user to change the cables on site for changes in antenna equipment, rather than sending the sheath to a specialty shop. The ribbon sheath is made of weather and ultraviolet resistant flexible material, which may be extruded plastic, sewn fabric, or the like.

Figure 7:
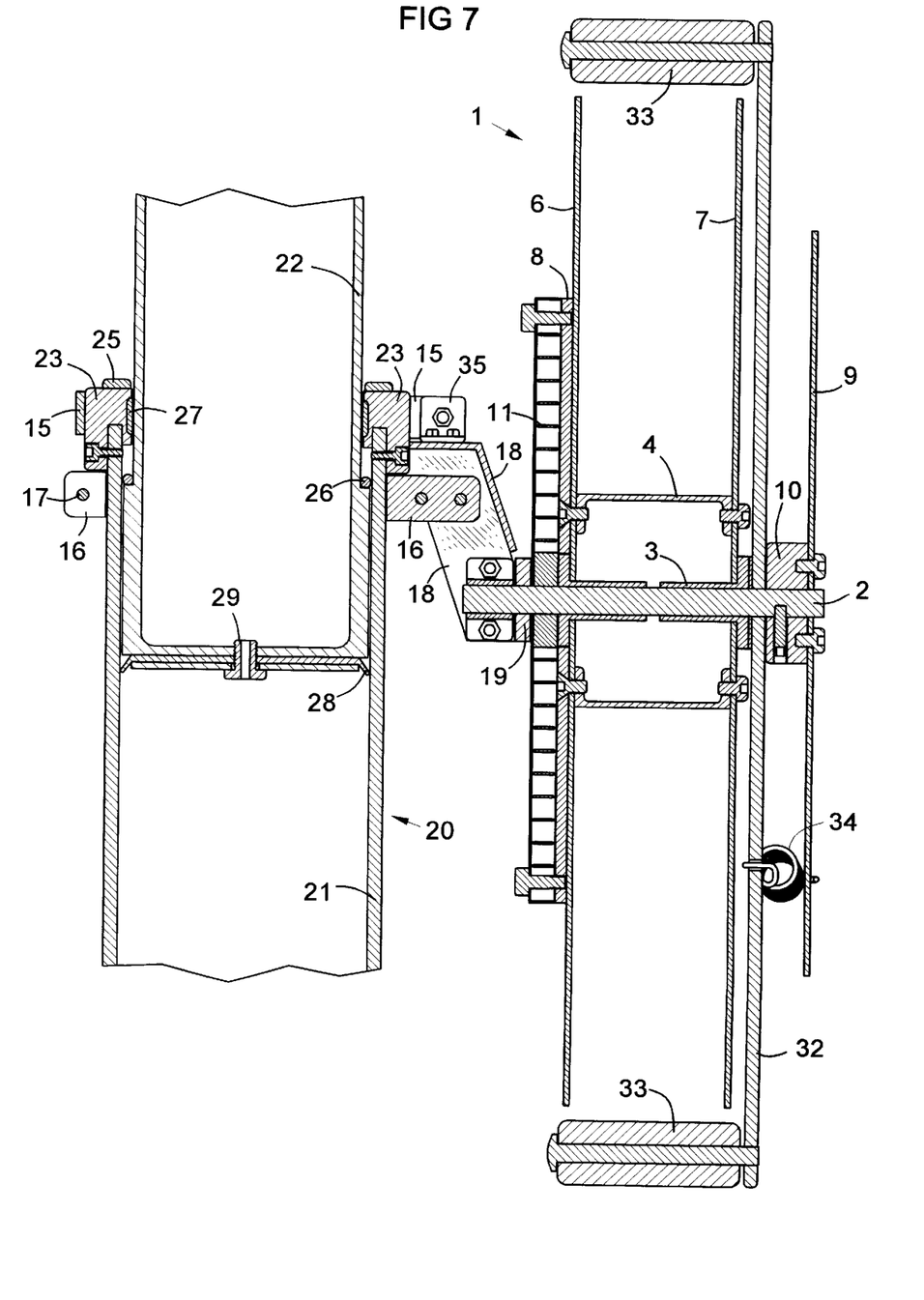
FIG. 7 is a back sectional view of FIG. 6 taken on line 7—7 of FIG. 8.

The reel is designed for easy maintenance and for retrofit to existing antenna masts. It is assembled by sliding the plates, bushings, hub, and a spring motor onto the axle, and locking them with a reel axle locking collar 10. As seen in FIG. 7, a relatively thick backing plate 8 provides an attachment base for the spring motor 11, the main inner plate 6, and the hub segments 4. The outer main plate 7 is separated from the inner main plate 6 by the length of the hub 4, providing clearance between the plates for the width of the ribbon cable. The hub segments are attached at a first end to the inner main plate, and at a second end to the outer main plate. At least the outer main plate is detachable from the hub for easy removal of the cable for service.

Figure 3:
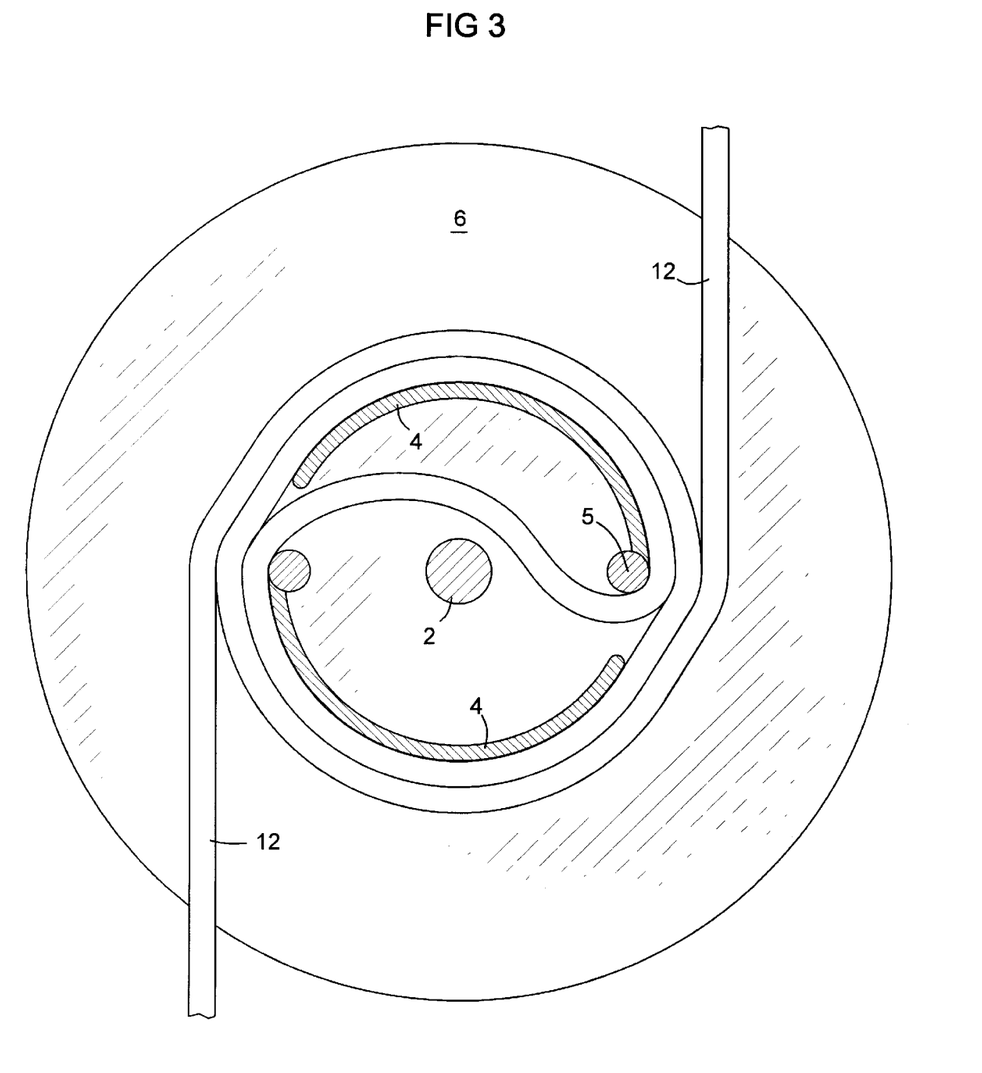
FIG. 3 is a left view of a cable reel according to the invention with the outer plates removed to show the cable route in the hub.

As shown in FIG. 3, the hub is made in segments 4 with a channel between them to allow passage of the cable through the hub. The hub is preferably made of two partial cylindrical shells with rounded entrances to the channel for smooth bending of the cable into the channel.

The spring motor contains a coiled torsion spring attached at an inner end to a spring hub, and at an outer end to a spring cover. The spring motor hub is keyed to the axle, and does not rotate. The spring cover is fastened to the backing plate and rotates with it. The spring motor can be wound by turning the hub. This can be done before insertion of the ribbon cable in the hub, or at least before connection of the cable ends to respective electrical contacts atop the mast and in the vehicle. Preferably the spring motor can be locked during connection of the cables by means such as a deadbolt (not shown) on the clamp frame blocking a tab on the spring motor cover.

The reel rotates about the axle on bushings 3. The rotating reel assembly includes the spring motor cover, backing plate, inner main plate, hub, bushings, and outer main plate. The spring motor urges this assembly to rotate in a takeup direction for automatic winding of the ribbon cable from two directions simultaneously.

An axle locking collar 10 holds the reel on the axle. It can be attached to the axle with a setscrew. Preferably a stationary end plate 9 is attached to the locking collar to cover and protect the reel and tensioner arm 32, and to provide a surface for graphics and/or printing. The locking collar and end plate do not rotate.

Figure 5:
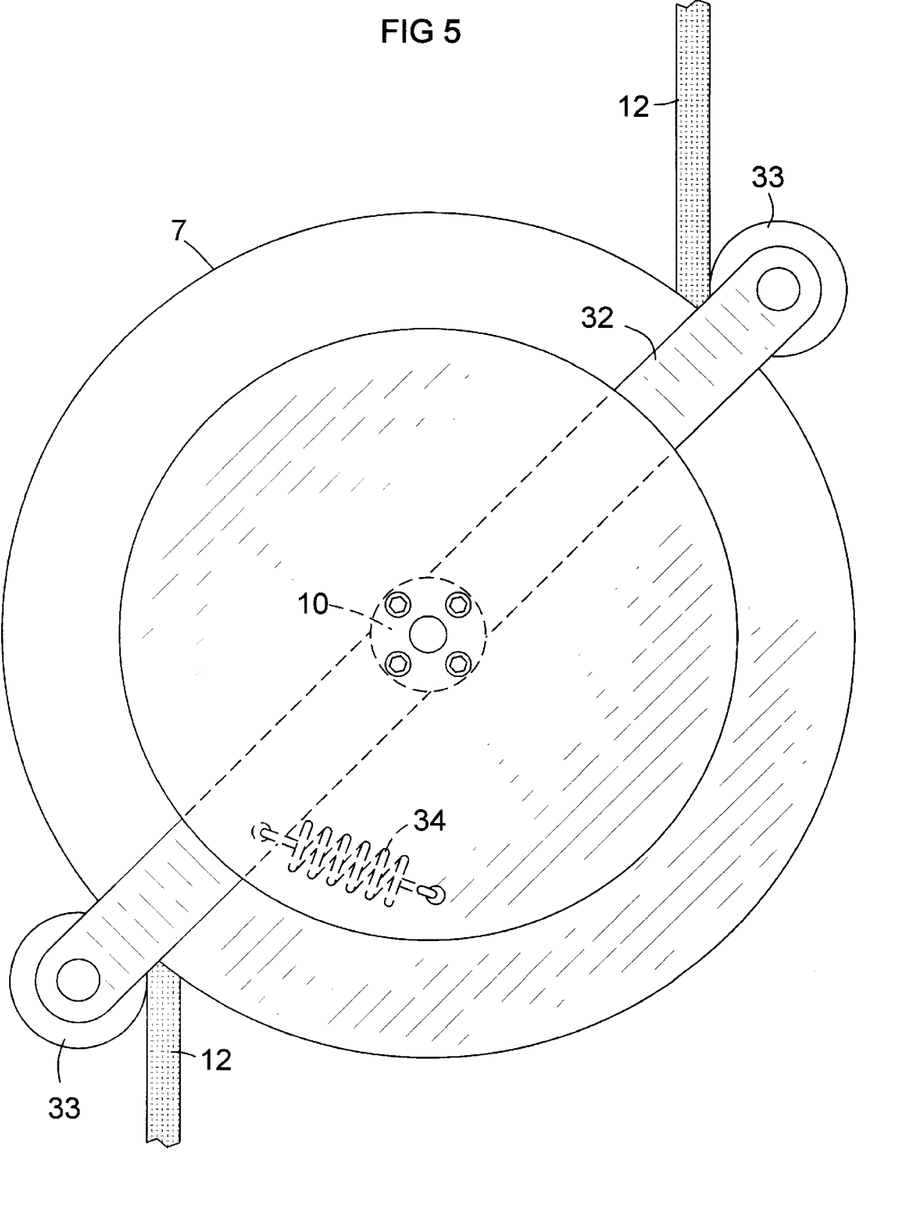
FIG. 5 is a enlarged left view of the cable reel, showing the cable tensioner arms and spring.
Figure 6:
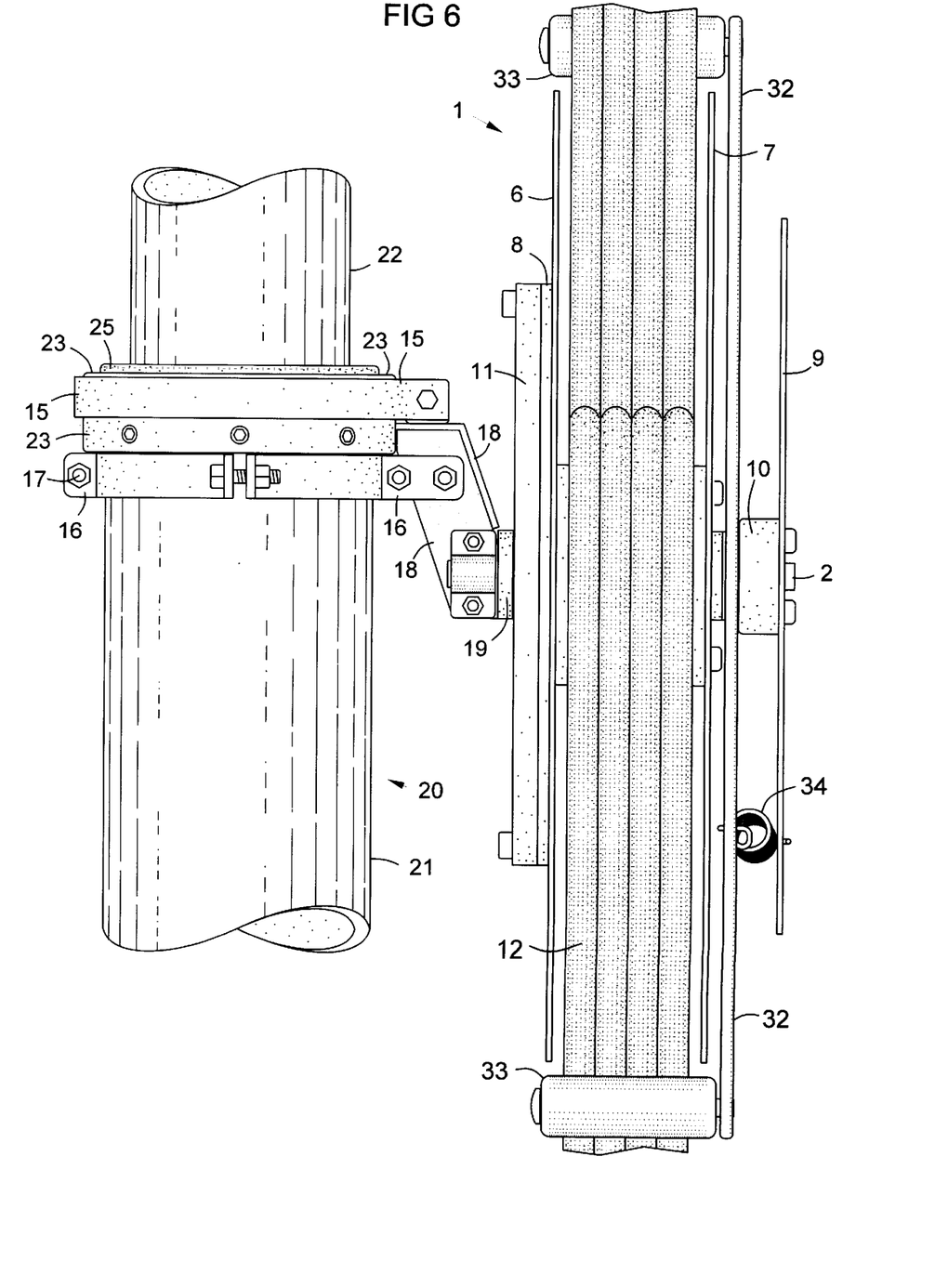
FIG. 6 is a back view of the cable reel mounted on a telescoping mast.

A cable tensioner wheel 33 is preferably provided on both the upper and lower feeds of the cable 12. These wheels may be supported on a single two-ended arm 32 journaled at its midpoint to the axle, and urged by a spring 34 to press the wheels inward against the cable as shown. Alternately each wheel may be supported on a separate arm and spring for independent tensioning of each feed of the cable. Alternately the wheels may be supported on stationary axles held by an arm or arms fixed to the axle or to the end plate. The purpose of the wheels is to prevent the cable from slipping out of the reel, and to eliminate slack in the cable.

As shown in FIG. 7, the upper end of each telescoping section of the mast has a mast section locking collar 23. The lower end of each section has an annular bumper 25. This bumper stops against the mast section locking collar, preventing the inner section from escaping the outer section at full extension. The mast section locking collars also serve to reinforce the upper end of each section.

Figure 8:
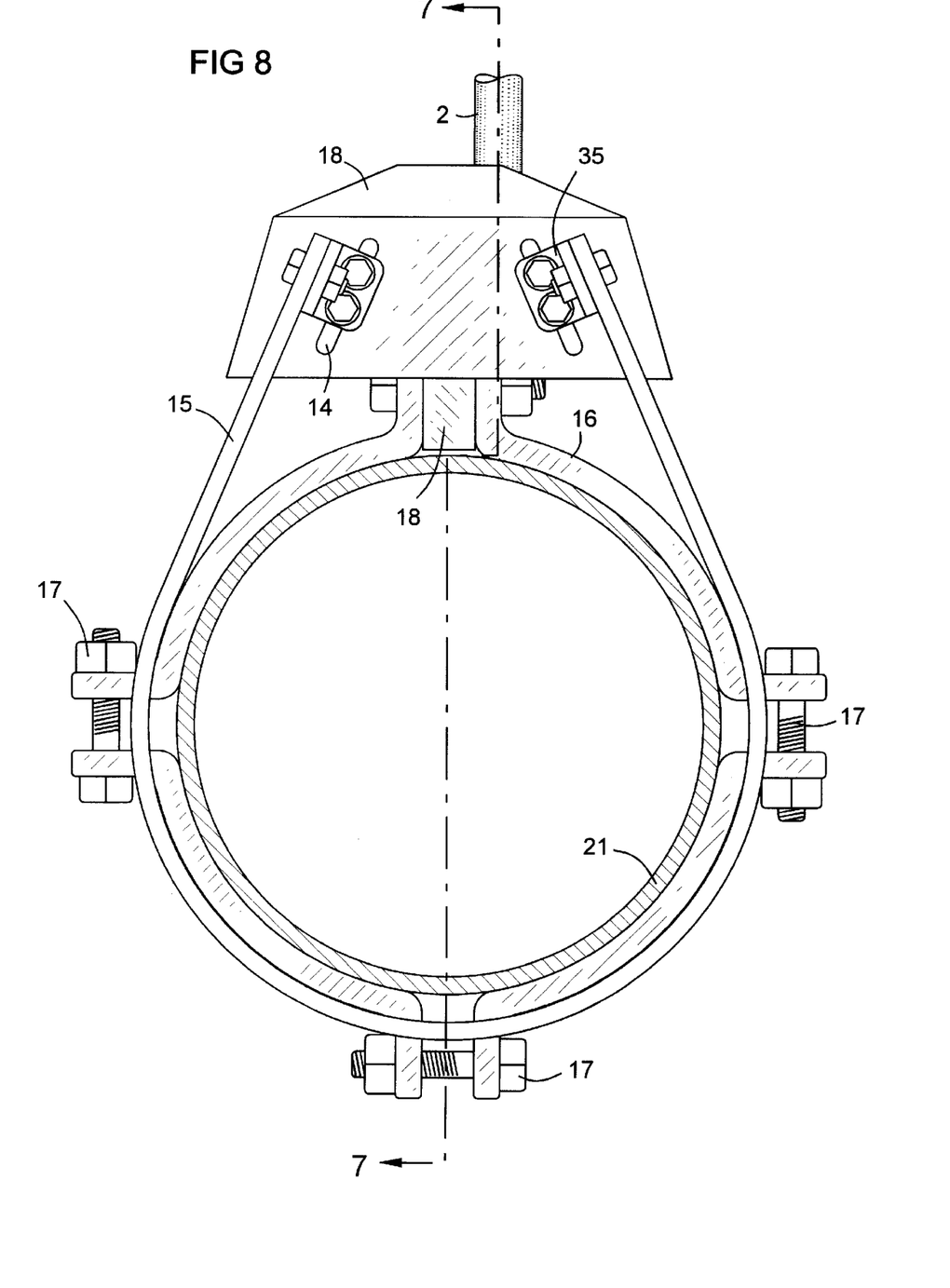
FIG. 8 is a top view of the clamping mechanism. The mast tube is sectioned on line 8—8 of FIG. 7. The clamp is not sectioned.

A special clamp is provided to firmly attach the reel to existing antenna masts in a range of diameters. It has two clamping straps 15 and 16 that distribute stress of the attachment over the mast section locking collar 23 and the upper end of the mast section 21. The upper clamp strap 15 is tightened around the mast section locking collar. The lower strap 16 is tightened around the mast tube just below the mast section locking collar. Two different means of tightening these straps are shown. The upper strap is tightened by adjusting the connection point(s) of one or both ends of the strap on the clamp frame. The lower strap is segmented, and is tightened by turning machine screws that interconnect the segments. Both of these methods provide tightening over a range of diameters.

The reason for using two different types of straps is that the upper strap is normally in tension. The lower strap is in tension around the mast, but is in compression at its attachment to the clamp frame. Thus, the upper strap is designed mainly to resist tension, while the lower strap is designed for resisting both tension and compression. The upper strap adjustment slots 14 adapt the upper strap for mast sections in a range of diameters, and sets the tilt angle of the reel. A common range of outer diameters for the mast tube section at the midpoint of the mast is about 5.5–6.5 inches, and for the mast section locking collar is 6.9–7.0 inches.

Advantages Over Helical Conduit

1. Wire and cable length is reduced by approximately 30%, reducing signal loss.
2. Weighs less than helical conduit, reducing wear on mast.
3. The weight of the reel and cable is distributed at the midpoint as well as the top of the mast, not only at the top.
4. Eliminates torsional force from helical conduit that stresses and wears the mast section keyways.
5. Due to the efficiencies above, and reduced expense, ribbon cable can provide capacity for more cables and wire than is practical with helical conduit.
6. Can support more electronics on the mast, due to the above advantages 1–5.
7. User can add or replace wire and cables without removing the system and shipping it to a repair shop or buying a replacement.
8. Can be retrofitted to existing vehicles.

Helical conduit is a specialized product, and can be profitably offered in only a limited range of sizes to satisfy standard requirements. Some vehicles use two helical conduits to meet capacity requirements. Multi-celled ribbon cable is much less expensive to produce, and can thus be made in a larger variety of sizes.

Although the present invention has been described herein with respect to preferred embodiments, it will be understood that the foregoing description is intended to be illustrative, not restrictive. Modifications of the present invention will occur to those skilled in the art. All such modifications that fall within the scope of the appended claims are intended to be within the scope and spirit of the present invention. This cable reel was designed for use on television communications vehicles, but it could be used on emergency, military, and radio vehicles as well.

I claim:

1. A dual-feed ribbon cable reel for a vertical telescoping mast, comprising:
    a reel having first and second plates, each plate having a plane and a periphery, a hub connected between the plates, the hub having at least one diametric channel for a ribbon cable;
    a ribbon cable passing through the diametric channel in the hub;
    a reel axle with an axis;
    the reel mounted rotatably on the axle;
    a clamp for attaching the axle to a telescoping mast;
    a first spring attached to the reel for urging the reel in a given rotation direction on the axle;
    a cable tensioner arm rotatably mounted on the axle adjacent one of the plates, the tensioner arm reaching beyond the periphery said one of the plates;
    a cable tensioner wheel mounted on the cable tensioner arm, extending between the planes of the two plates, having a rotation axis parallel to the reel axle axis; and
    a second spring attached to the tensioner arm for urging the tensioner arm to rotate on the axle in the opposite rotation direction from the given rotation direction of the reel;
    whereby the clamp can be attached to a vertical telescoping mast, and the first spring will wrap the cable around the hub from two directions simultaneously.

2. A dual-feed ribbon cable reel for a vertical telescoping mast, comprising:
    a clamp frame;
    an upper strap formed as a loop having two ends attached to the clamp frame;
    at least one of the ends of the upper strap attached at an adjustable position to the clamp frame;
    a lower strap formed as a loop comprising plural arcuate segments;
    at least one of the arcuate segments having two ends, each end of the one arcuate segment having a radially extending boss for receiving a threaded bolt for attachment to a neighboring segment;
    a horizontal axle attached to the clamp frame;
    a reel rotatably mounted on the axle;
    a hub in the reel having at least one diametric channel;
    a spring motor fixed to the axle and attached to the reel for urging the reel to rotate
    whereby the clamp frame can be attached to a vertical telescoping mast by means of the two straps, a cable can be passed diametrically through the hub in the reel, and the spring motor will wrap the cable around the hub from two directions simultaneously.

3. A dual-feed ribbon cable reel for a telescoping antenna mast, comprising:
    a multi-celled ribbon cable sheath having a width and outer and inner sides with respect to winding on a reel in a given direction;
    a reel having an axle with a first axis, a take-up rotation direction in which the cable sheath is wound onto the reel, and an opposite feed rotation direction;
    the reel having first and second main plates connected to the axle rotatably about the first axis, substantially parallel to each other, separated from each other by a clearance that accepts the width of the cable sheath, each main plate having a plane and a circumference;
    a hub in the reel between the main plates and around the first axis;
    the hub having first and second ends against the respective main plates and having a channel for the cable sheath to pass through the hub, the channel blocked from access in an axial direction by the second main plate;
    the second main plate being removable from the axle to expose the channel in the hub;
    a clamp that connects the reel to a telescoping mast;
    a spring motor on the reel that continuously urges the reel to rotate in a given direction;
    whereby a selection of cables can be pulled through the sheath, then the sheath inserted in the channel in the hub at approximately the midpoint of the sheath length, then the reel attached to a telescoping mast at approximately the midpoint of the mast when extended, and when the mast retracts, the cable will automatically wind onto the reel from both directions.

4. The dual-feed ribbon cable reel of claim 3, further comprising a cable tensioning wheel urged against the cable sheath in a direction that prevents the cable sheath from slipping off the reel.

5. The dual-feed ribbon cable reel of claim 3, further comprising:
    a cable tensioning arm having first and second ends and a midpoint;
    the tensioning arm attached to the axle, adjacent the second main plate, opposite from the hub, at approximately the midpoint of the arm, to rotate about the first axis;
    the ends of the tensioning arm extending radially beyond the circumference of the second main plate;
    the first and second ends of the arm having first and second wheels that rotate on second and third axes respectively, the second and third axes both parallel to the first axis;
    the wheels extending between the planes of the main plates; and
    a spring attached between the tensioning arm and the second main plate, urging the arm to rotate about the first axis in the feed direction of rotation;
    whereby the wheels can be placed against the outer side of the cable sheath to urge the sheath inward toward the hub and remove slack in the cable sheath in operation, to prevent the cable sheath from slipping off the hub.

6. The dual-feed ribbon cable reel of claim 3, wherein the clamp comprises:
    a clamp frame attached to one end of the reel axle;
    upper and lower straps attached to the clamp frame.

* * * * *